Patented Jan. 9, 1934

1,942,801

UNITED STATES PATENT OFFICE 1,942,801

ANTISEPTIC AND GERMICIDE

Edgar C. Britton, Midland, Mich., assignor to The Dow Chemical Company, Midland, Mich., a corporation of Michigan No Drawing. Application May 12, 1930
Serial No. 451,846

6 Claims. (Cl. 167—31)

The present invention concerns new and useful improvements in antiseptics and germicides. I have found that ortho-cyclohexylphenol, or salts thereof such as copper, ammonium, sodium, or other metallic salts, may be employed as the effective agent in improved germicidal or antiseptic compositions.

My invention, then, consists of the new antiseptics and germicides herein fully described and particularly pointed out in the claims, the following description setting forth in detail several approved combinations of ingredients embodying my invention, such disclosed means constituting, however, but several of various ways in which the principle of my invention may be used.

A mixture of ortho- and para-cyclohexylphenols may be prepared by reacting cyclohexene with phenol in the presence of a suitable catalyst such as phosphoric anhydride, or a siliceous earth, according to known methods. The crude reaction product may then be fractionally distilled to separate ortho- and para-cyclohexylphenol therefrom.

I have found that the crude reaction mixture comprising unreacted phenol together with ortho- and para-cyclohexylphenols, may be utilized for germicidal purposes, either as such or in the form of salts thereof, or that the refined ortho- or para-compounds or mixtures thereof may be used. Such components are employed in a form by which the same can conveniently reach the living organism to be destroyed. For instance, the above ingredients may be employed in emulsified form, dissolved or suspended in a suitable liquid vehicle, or in solid form, which may be conveniently admixed with or supported on a relatively inert solid carrier such as silica, graphite, talc, or the like, or the said ingredients may be employed in the form of their salts, such as an alkali-metal salt.

Moreover, my improved germicides which have high disinfectant properties, are relatively non-poisonous and non-irritating to the higher organisms.

The soluble salts, such as sodium ortho-cyclohexylphenate may conveniently be used in aqueous solution, whereas the free phenol may be employed either in aqueous solution, or in another solvent, such as water-glycerine solution, or water-benzene solution.

The following table shows the results obtained when testing ortho-cyclohexylphenol in a solution of the compostion, 1 gm. ortho compound, 2 cc. benzene, and 97 cc. water, according to well known procedure, against *B. typhosus;*

| Sample | Dilution | Time of exposure of culture to disinfectant, in minutes | | | Phenol coefficient |
|---|---|---|---|---|---|
| | | 5 | 10 | 15 | |
| Disinfectant | 1:3750<br>1:4000<br>1:4250 | +<br>+<br>+ | −<br>+<br>+ | −<br>−<br>+ | 40 |

(Phenol, used as a standard disinfectant, was effective at a dilution of 1 : 05).

Accordingly, ortho-cyclohexylphenol, as above tested, is approximately 40 times as effective against *B. typhosus* as is phenol.

Other modes of applying the principle of my invention may be employed instead of those explained, change being made as regards the steps or materials employed, provided the details stated by any of the following claims or the equivalent of such be employed.

I therefore particularly point out and distinctly claim as my invention:—

1. An antiseptic and germicidal composition comprisng an ortho-cyclohexylphenol compound having the general formula;

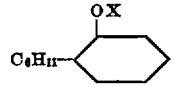

wherein X represents hydrogen or an alkali-metal.

2. An antiseptic and germicidal composition comprising ortho-cyclohexylphenol.

3. An antiseptic and germicidal solution concomprising an ortho-cyclohexylphenol compound having the general formula;

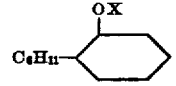

wherein X represents hydrogen or an alkali-metal.

4. An antiseptic and germicidal solution containing ortho-cyclohexylphenol.

5. An antiseptic and germicidal aqueous solution containing an ortho-cyclohexylphenol compound having the general formula;

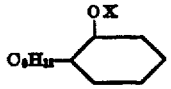

wherein X represents hydrogen or an alkali-metal.

6. An antiseptic and germicidal aqueous solution containing ortho-cyclohexylphenol.

EDGAR C. BRITTON.

CERTIFICATE OF CORRECTION.

Patent No. 1,942,801.      January 9, 1934.

EDGAR C. BRITTON.

It is hereby certified that error appears in the printed specification of the above numbered patent requiring correction as follows: Page 1, line 53, for "compostion" read composition; line 68, in the enclosed words after the table for "dilution of 1:05" read dilution of 1:95; line 81, for "comprisng" read comprising; and line 93, claim 3, for "comprising" read taining; and that the said Letters Patent should be read with these corrections therein that the same may conform to the record of the case in the Patent Office.

Signed and sealed this 27th day of February, A. D. 1934.

F. M. Hopkins (Seal)      Acting Commissioner of Patents.

4. An antiseptic and germicidal solution containing ortho-cyclohexylphenol.

5. An antiseptic and germicidal aqueous solution containing an ortho-cyclohexylphenol compound having the general formula:

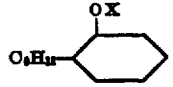

wherein X represents hydrogen or an alkali-metal.

6. An antiseptic and germicidal aqueous solution containing ortho-cyclohexylphenol.

EDGAR C. BRITTON.

CERTIFICATE OF CORRECTION.

Patent No. 1,942,801.  January 9, 1934.

EDGAR C. BRITTON.

It is hereby certified that error appears in the printed specification of the above numbered patent requiring correction as follows: Page 1, line 53, for "compostion" read composition; line 68, in the enclosed words after the table for "dilution of 1:05" read dilution of 1:95; line 81, for "comprisng" read comprising; and line 93, claim 3, for "comprising" read taining; and that the said Letters Patent should be read with these corrections therein that the same may conform to the record of the case in the Patent Office.

Signed and sealed this 27th day of February, A. D. 1934.

F. M. Hopkins (Seal)  Acting Commissioner of Patents.